United States Patent [19]
Klingensmith

[11] Patent Number: 4,954,548
[45] Date of Patent: Sep. 4, 1990

[54] ETHYLENE-CARBON MONOXIDE COPOLYMER STABILIZATION

[75] Inventor: George B. Klingensmith, Houston, Tex.

[73] Assignee: Shell Oil Company, Houston, Tex.

[21] Appl. No.: 343,770

[22] Filed: Apr. 27, 1989

[51] Int. Cl.$^5$ .............................................. C08K 5/18
[52] U.S. Cl. .................................. 524/258; 524/194; 524/291; 524/495
[58] Field of Search ............... 528/392; 524/258, 495, 524/496

[56] References Cited

U.S. PATENT DOCUMENTS

| | | | |
|---|---|---|---|
| 3,505,225 | 4/1970 | Wheeler | 524/305 |
| 3,676,401 | 7/1972 | Henry | 523/126 |
| 3,694,412 | 9/1972 | Nozaki | 260/63 CQ |
| 3,753,952 | 8/1973 | Guillet | 523/125 |
| 3,929,727 | 12/1975 | Russell et al. | 260/45.95 F |
| 4,024,104 | 5/1977 | Russell et al. | 260/45.8 R |

FOREIGN PATENT DOCUMENTS

| | | |
|---|---|---|
| 121965 | 3/1984 | European Pat. Off. . |
| 181014 | 5/1986 | European Pat. Off. . |
| 213671 | 8/1986 | European Pat. Off. . |
| 257663 | 5/1987 | European Pat. Off. . |

OTHER PUBLICATIONS

E. Kovacs et al.; J. Polymer Science: Symposium No. 57, 171–180 (1976).

Scott, G.; Developments in Polymer Stabilization −5, 71–85 (1982).

*Primary Examiner*—Veronica P. Hoke

[57] ABSTRACT

Compositions comprising linear alternating polymers of carbon monoxide and at least one ethylenically unsaturated hydrocarbon are stabilized against degradation caused by exposure to UV light by the inclusion therein of an aromatic diamine and a certain type of carbon black.

20 Claims, No Drawings

ETHYLENE-CARBON MONOXIDE COPOLYMER STABILIZATION

FIELD OF THE INVENTION

This invention relates to certain stabilized compositions comprising a linear alternating polymer of carbon monoxide and at least one ethylenically unsaturated hydrocarbon. More particularly, the invention relates to such polymer compositions which are stabilized against the detrimental effects of ultraviolet light by the incorporation therein of certain synergistic stabilizers.

BACKGROUND OF THE INVENTION

The class of polymers of carbon monoxide and olefin(s) has been known in the art for some time. Brubaker, U.S. Pat. No. 2,495,286, produced such polymers of relatively low carbon monoxide content in the presence of free radical initiators, e.g., peroxy compounds. U.K. No. 1,081,304 produces similar polymers of higher carbon monoxide content in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. No. 3,694,412.

More recently the class of linear alternating polymers of carbon monoxide and at least one ethylenically unsaturated hydrocarbon has become of greater interest, in part because of the greater availability of the polymers. More recent processes for the production of these polymers, also known as polyketones or polyketone polymers, is illustrated by a number of published European Patent applications including Nos. 121,965, 181,014, 213,671 and 257,633. The process, now broadly considered conventional, generally involves the use of a catalyst composition formed from a Group VIII metal selected from palladium, cobalt or nickel, the anion of a non-hydrohalogenic acid having a pKa below about 6, preferably below 2, and a bidentate ligand of phosphorus, arsenic or antimony.

The resulting polymers are relatively high molecular weight materials having utility as premium thermoplastics in the produciion of shaped articles by methods conventional for the processing of thermoplastics. Although the polymers are relatively stable, the linear alternating polymers do undergo to some degree the degradation by exposure to elevated temperatures and to ultraviolet light characteristic of most if not all organic polymers.

Russell et al, U.S. Pat. No. 3,929,729 and U.S. Pat. No. 4,024,104, teach the use of certain benzophenones and of certain benzotriazoles as thermal stabilizers of certain polymers of carbon monoxide and ethylene with the optional presence of third monomers. Although the disclosure of the scope of polymers by Russell et al is rather broad, the scope of polymers tested is rather narrow and the Russell et al teachings do not appear to be particularly directed toward linear alternating polymers. In copending U.S. patent application Ser. No. 167,801, filed Mar. 14, 1988 (Docket No. K-0730) there is disclosed a class of stabilizers useful to retard the degradation by UV light of the linear alternating polymers of carbon monoxide and at least one ethylenically unsaturated hydrocarbon. Among the members of this class are diphenylamines of defined structure, including 4,4'-bis(α,α-dimethylbenzyl)diphenyl amine, a commercial antioxidant marketed by Uniroyal as NAUGARD® 445 Antioxidant. Although the use of this and related diphenylamines is useful in retarding degradation caused by exposure to UV light, it would be of advantage to provide improved UV stabilization.

SUMMARY OF THE INVENTION

This invention provides polymer compositions stabilized against degradation resulting from exposure to ultraviolet light and to a method for producing such stabilized compositions. More particularly, the invention provides compositions comprising a linear alternating polymer of carbon monoxide and at least one ethylenically unsaturated hydrocarbon, which compositions are stabilized against degradation caused by exposure to UV light by the incorporation of a diphenylamine and a certain type of carbon black.

DESCRIPTION OF THE INVENTION

The compositions of the invention comprise linear alternating polymers of ethylene and at least one ethylenically unsaturated hydrocarbon which are stabilized against degradation resulting from exposure to UV light by the incorporation therein of a synergistic combination of a diphenylamine and a certain type of carbon black. The ethylenically unsaturated hydrocarbons useful as precursors of the polyketone polymers have up to 20 carbon atoms inclusive, preferably up to 10 carbon atoms, and are aliphatic such as ethylene and other α-olefins including propylene, 1-butene, isobutylene, 1-octene and 1-dodecene or are arylaliphatic having an aryl substituent on an otherwise aliphatic molecule, particularly an aryl substituent on a carbon atom of the ethylenic unsaturation. Examples of this latter class of ethylenically unsaturated hydrocarbons include styrene, p-methylstyrene, p-ethylstyrene and m-isopropylstyrene. Preferred polyketone polymers are copolymers of carbon monoxide and ethylene or terpolymers of carbon monoxide, ethylene and a second hydrocarbon of at least 3 carbon atoms, particularly an α-olefin such as propylene.

When the preferred terpolymers of carbon monoxide, ethylene and a second hydrocarbon are employed, there will be at least about two units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is therefore represented by the repeating formula $$\mathrm{+CO+CH_2-CH_2+_{\overline{x}}+CO+G+_{\overline{y}}} \qquad (I)$$

wherein G is the moiety of the of the second hydrocarbon polymerized through the ethylenic unsaturation thereof. The $-\mathrm{CO+CH_2\text{-}CH_2)}-$ units and the $+\mathrm{CO-G)}-$units are formed randomly throughout the polymer chain and the ratio of y:x is no more than about 0.5. In the modification of the invention where copolymezs of carbon monoxide and ethylene without the presence of a second hydrocarbon are employed, the polymers are represented by the above formula I wherein y is 0. When y is other than 0, i.e., terpolymers are employed, the preferred ratios of y:x are from about 0.01 to about 0.1. The end groups or "caps" of the polymer chain will depend on what materials are present during production of the polymer and how or whether the polymer is purified. The precise nature of the end groups is of little apparent significance so far as the overall properties of the polymers are concerned so that the polymers are fairly represented by the polymer chain as depicted above.

Of particular interest are the polymers of number average molecular weight from about 1000 to about 200,000, particularly those polymers of molecular weight from about 20,000 to about 90,000, as determined by gel permeation chromatography. The physical properties of the polymers will depend in part upon the molecular weight, whether the polymer is a copolymer or a terpolymer and, in the case of terpolymers, the nature of and the proportion of the second hydrocarbon. Typical melting points for such polymers are from about 175° C to about 300° C, more frequently from about 210° C to about 270° C. The polymers will have a limiting viscosity number (LVN), when measured in m-cresol at 60° C, of from about 0.5 to about 10, preferably from about 0.8 to about 4.

The polymers are produced by the general methods of the above published European Patent Applications and the method of production which is now becoming conventional is to contact the carbon monoxide and hydrocarbon in the presence of a catalyst composition formed from a palladium salt, the anion of a non-hydrohalogenic acid having a pKa below about 6 and a bidentate ligand of phosphorus. The scope of the process for polyketone production is extensive but, without wishing to be limited, a preferred palladium salt is a palladium carboxylate, particularly palladium acetate, a preferred anion is the anion of trifluoroacetic acid or p-toluenesulfonic acid, and a preferred bidentate ligand of phosphorus is 1,3-bis(diphenylphosphino)propane or 1,3-bis[di(2-methoxyphenyl)phosphino]propane.

Polymerization is conducted in the liquid phase in the presence of a liquid reaction diluent such as an alkanol, e.g., methanol or ethanol or a lower alkanone, e.g., acetone. The reactants are contacted under polymerization conditions in the presence of the catalyst composition by conventional methods such as shaking or stirring in a suitable reaction vessel. Polymerization conditions include reaction temperatures from about 20° C. to about 150° C., preferably from about 50° C. to about 135. Typical reaction pressures are from about 1 bar to about 200 bar, but pressures from about 10 bar to about 100 bar are preferred. Subsequent to the desired reaction the polymerization is terminated by cooling the reactor and contents and by releasing the pressure. The polymer product is typically insoluble in the product mixture and is recovered by conventional methods such as filtration or decantation. The polymer is used as recovered or is purified, if desired, as by contacting the polymer with a solvent selective for catalyst composition residues.

The polyketone polymers of the invention are stabilized against degradation caused by exposure to ultraviolet light by incorporation therein of a stabilizing amount of a synergistic combination of a diphenylamine and a particular form of carbon black. While the theory by which the polyketone polymer is protected against such degradation is not completely understood, it is apparent that the combination of the diphenylamine and the particular carbon black provides better protection than the additive effect of the individual components or similar combinations which contain other forms of carbon black.

The diphenylamine component of the stabilizer has two aromatic ring systems individually bonded to a nitrogen atom additionally containing a hydrogen substituent. Each aromatic ring system has up to 30 carbon atoms inclusive, preferably up to 20 carbon atoms inclusive, and up to 2 aromatic rings inclusive. Each aromatic ring system individually is hydrocarbon containing only atoms of carbon and hydrogen or is substituted hydrocarbon additionally containing other inert atoms or groups of atoms, for example, halogen atoms such as chlorine or bromine. A preferred class of diphenylamines is represented by the formula

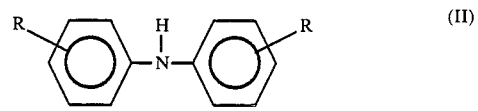

wherein R individually is alkyl of up to 12 carbon atoms, phenyl or benzyl having up to 2 alkyl substituents of up to 8 carbon atoms inclusive on the benzylic or methylene carbon atom. Illustrative of such diphenylamines are diphenylamine, di(4-methylphenyl)amine, di(4-benzylphenyl)amine, 4,4'-bis(α,α-di-n-propylbenzylphenyl)amine, di(4-α-ethylbenzyl)diphenylamine, di(4-phenylphenyl)amine, 4-propylphenyl 4-phenylphenyl amine, di(3-nonylphenyl)amine, 4,4'-bis(α,α-dimethylbenzyl)diphenylamine and 4-benzylphenyl 4-phenylphenyl amine. Particularly preferred are the diphenylamines of the above formula II wherein at least one R is n-alkyl of from 6 to 10 carbon atoms inclusive or α,α-dimethylbenzyl. Especially preferred as the diphenylamine component of the stabilizer is 4,4'-bis(α,α-dimethylbenzyl)diphenylamine. The diphenylamine is employed in a stabilizing quantity. Amounts of the diphenylamine from about 0.05% by weight to about 5% by weight, based on total polymer to be stabilized, are satisfactory with amounts from about 0.1 to about 3% by weight on the same basis being preferred.

The carbon black which is usefully employed as a component of the stabilizer is a type of channel-type carbon black. The particular type of carbon black that is effective in the synergistic stabilizer combinations of the invention is characterized as being weakly acidic. Other forms of carbon black that are more acidic, neutral or weakly basic do not exhibit synergism in combination with the diphenylamine and impart only minor photoprotection through the screening out of incident ultraviolet radiation. The term carbon black is generic for a class of finely divided carbonaceous products resulting from pyrolysis of hydrocarbon gases or oils. Carbon blacks typically have particle sizes in the range of from about 100 Å to 5000 Å and surface areas of from about 6 m²/g. The carbon content ranges from about 83% to about 99%. Channel-type carbon blacks result when natural gas with or without oil vapors is burned in a multitude of small flames which impinge on a channel surface by methods well known in the art of manufacturing carbon blacks. The channel carbon blacks are among the most finely divided carbon blacks with particle sizes generally less than 500 Å, e.g., from about 100 Å to about 450 Å. The materials present in such carbon blacks other than carbon will depend upon what additional materials are present in the gas and/or oil undergoing combustion and whether or not the carbon black receives a post treatment. The carbon blacks may have, in addition to carbon, amounts of hydrogen, oxygen, sulfur and heavy metals chemically combined within the crystalline structure. When a gas/oil mixture is employed in the production of a carbon black which contained chemically combined sulfur, the carbon black product will also have sulfur within the structure of the carbon black. The channel-type carbon blacks useful in the compositions of the invention are weakly acidic showing a pH of from about 3.5 to about 6.5, preferably from about 4 to about 5. The precise nature of the role of pH in the chemistry of photostabilization is not known with certainty but the chemistry of aliphatic ketones is often sensitive to pH, showing bell-shaped or inverted bell-shaped responses in reaction rates influenced by pH. The production of such channel-type, weakly acidic carbon blacks is known in the art and certain of the carbon blacks of this type are commercial, e.g., the PRINTEX ® 140 Carbon Black marketed by Degussa. The quantity of the weakly acidic carbon black to be utilized is from about 0.5% by weight to about 10% by weight based on total polymer to be stabilized, but preferably from about 1% by weight to about 5% by weight on the same basis.

The diphenylamine and the carbon black components of the stabilizer are added to the polymer by conventional methods suitable for forming an intimate mixture of the polymer and the UV stabilizer components. Such methods include dry blending of the polymer and stabilizer components in a finely divided form followed by hot pressing or by extrusion of the mixture. Alternatively the stabilized composition is formed by blending the components in a mixer or blender operating at high shear. The stabilized composition may also include other components such as antioxidants, colorants, plasticizers, fibers and dyes which are added to the polymer together with or separately from the UV stabilizer components. In a preferred embodiment, the polyketone Polymer is additionally stabilized against oxidative deterioration by the inclusion therein of a hindered phenolic compound and a variety of commercial antioxidants are useful for this purpose. A N,N'-bis[3-(4-hydroxy-3,5-di-t-butylphenyl)propanoyl]hydrazine marketed as MD 1024 Antioxidant and a 1,2-bis[3-(4-hydroxy-3,5-di-6butylphenyl)alkanoyloxy)ethane marketed as IRGANOX ® 245 Antioxidant, or mixtures thereof, provides suitable stabilization.

The stabilized polyketone compositions are useful in the manufacture of fibers, sheets, films, laminates, containers and wire and cables of estabilished utility which are produced by conventional methods such as melt-spinning, extrusion, injection molding and thermoforming. The compositions are particularly useful in applications where the finished product is likely to be exposed directly to ultraviolet light such as structural parts used in construction or parts produced for external automotive applications.

The invention is further illustrated by the following Illustrative Embodiments which should not be construed as limiting the invention.

ILLUSTRATIVE EMBODIMENT I

A terpolymer of carbon monoxide, ethylene and propylene was produced in the presence of a catalyst composition formed from palladium acetate, trifluoroacetic acid and 1,3-bis[di(2-methoxyphenyl)phosphino]-propane. This polymer, termed Polymer A, had a melting point of 219° C. and a LVN of 1.72, measured in m-cresol at 60° C.

A second polymer was produced employing the same catalyst composition. This polymer, termed Polymer B, had a melting point of 220° C. and a LVN of 1.8, measured in m-cresol at 60° C.

Each polymer contained about 1% of commercial hindered phenolic antioxidants to provide background stabilization.

ILLUMSTRATIVE EMBODIMENT II

Samples of compositions comprising Polymer A or Polymer B containing candidate UV stabilizers were prepared by mixing the components and hot pressing test specimens of 0.010 inch in thickness. The specimens were subjected to a diurnal UV-A irradiation at 40° C in air and periodically a sample was withdrawn and evaluated by ZGL tensile impact testing.

The ZGL procedure employs a testing device which includes a pneumatic drive, a piezoelectric transducer, automatic data acquisition and analysis and user friendly software and reporting. An environmental chamber controls the relative humidity and temperature during testing. The ends of a notched test specimen are separated at a constant rate, e.g., at speeds up to 5000 in/min, to give failure times of 100–500 $\mu$sec. Local strain rates are produced in the ZGL test specimens which are comparable to those in the first incremental deformation at the notch during a conventional Izod test. In the ZGL version of the notched Izod, the selected velocity is maintained throughout the test which makes the ZGL test more severe than the conventional notched Izod. Thus, the values obtained are somewhat lower than conventional values but are valid for comparison of toughness among various materials. The transition from ductile to brittle behavior of the polyketone polymers occurs at a ZGL impact strength of 5 $kj/m^2$ which is regarded as the point of failure.

In Table I, data are provided to measure loss of toughness for Polymer A, a composition comprising polymer A and 1.8% by weight of a stabilizer package containing Irganox ® 1024 and Irganox ® 225 (marketed by Ciba-Geigy) and Naugard ® 445 (an aromatic diamine marketed by Uniroyal), a composition containing Polymer A and 3% by weight of a Degussa channel-type carbon black containing 8.9% sulfur marketed as Printex ® 140, and a composition comprising Polymer A, 1.8% of the additive package and 3% of the carbon black. In these and subsequent compositions containing the additive package, sufficient additive package was provided to give a concentration of 0.49% by weight of Naugard ® 445, i.e., 4,4'-bis($\alpha,\alpha$-dimethylbenzyl)diphenyl amine. In each case, the ZGL impact in $kj/m^2$ was measured as a function of time to failure

TABLE 1

| Sample | ZGL Impact | | | |
| --- | --- | --- | --- | --- |
|  | 0 hrs | 20 hrs | 50 hrs | 225 hrs |
| Polymer A | 37 | 2 | — | — |
| Polymer A + package | 62 | 3 | — | — |
| Polymer A + Printex ® 140 | 57 | 5 | — | — |
| Polymer A + package + Printex ® 140 | 63 | 52 | 35 | 19 |

ILLUSTRATIVE EMBODIMENT III

By a procedure similar to that of Illustrative Embodiment II, samples were evaluated containing Polymer A, Polymer A plus additive package, Polymer A plus 3% Printex ® 140 and Polymer A plus additive package plus 3% Printex ®140. The results are shown in Table II.

TABLE II

| Sample | ZGL Impact | | | |
|---|---|---|---|---|
| | 0 hrs | 25 hrs | 100 hrs | 250 hrs |
| Polymer A | 37 | 1 | — | — |
| Polymer A + add. pack. | 82 | 2 | — | — |
| Polymer A + Printex ® 140 | 58 | 2 | — | — |
| Polymer A + add. pack. + Printex ® 140 | 85 | 50 | — | — |

ILLUSTRATIVE EMBODIMENT IV

By a procedure similar to that of Illustrative Embodiment II, samples were evaluated comprising Polymer B, Polymer B plus 0.5% Naugard ®445 and Polymer B plus 0.5% Naugard ®445 and 3% Printex ®140. The results are shown in Table III.

TABLE III

| Sample | ZGL Impact | | | |
|---|---|---|---|---|
| | 0 hrs | 10 hrs | 25 hrs | 100 hrs |
| Polymer B | 32 | 3 | 1 | — |
| Polymer B + Naugard ® 445 | 32 | 5 | 1 | — |
| Polymer B + Naugard ® 445 + Printex ® 140 | 32 | 9 | 9 | 9 |

ILLUSTRATIVE EMBODIMENT V

Samples of a polyketone polymer containing 3% by weight of various commercial carbon blacks, 0.5% by weight of Irganox ®445 were evaluated by a procedure similar to that of Illustrative Embodiment II to determine the time, in hours, to embrittlement of the samples. The results are shown in Table IV.

TABLE IV

| Carbon Black Type of Carbon Black | Printex ® 140B channel | Raven ® 570 furnace | Sterling ® NS furnace |
|---|---|---|---|
| pH of Carbon Black | 4.0 | 2.5 | 8.5 |
| Time to Embrittlement, hrs | 300 | 24 | 64 |

What is claimed is:

1. A composition stabilized against degradation caused by exposure to UV light which comprises a linear alternating polymer of carbon monoxide and at least one ethylenically unsaturated hydrocarbon and a stabilizing quantity of a mixture of a diphenylamine and a weakly acidic channel-type carbon black with a pH from about 3.5 to about 6.5.

2. The composition of claim 1 wherein the polymer is represented by the repeating formula

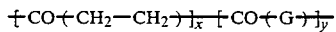

wherein G is the moiety of an ethylenically unsaturated hydrocarbon of at least 3 carbon atoms polymerized through the ethylenic unsaturation and the ratio of y:x is no more than about 0.5.

3. The composition of claim 3 wherein the diphenylamine is present in a quantity from about 0.5% by weight to about 5% by weight based on total polymer.

4. The composition of claim 3 where the carbon black is present in quantity of from about 0.5% to about 10% by weight, based on total polymer.

5. The composition of claim 4 wherein y is 0.

6. The composition of claim 4 wherein the ratio of y:x is from about 0.01 to about 0.1.

7. The composition of claim 6 wherein G is a moiety of propylene.

8. The composition of claim 7 wherein the diphenylamine is 4,4'-bis(α,α-dimethylbenzyl)diphenylamine.

9. The composition of claim 8 wherein the diphenylamine is present in a quantity of from about 0.1% by weight to about 3% by weight, and the carbon black is present in a quantity of from about 1% by weight to about 5% by weight.

10. The composition of claim 1 wherein the carbon black has a pH from about 4 to about 5.

11. A method for stabilizing a linear alternating polymer of carbon monoxide and at least one ethylenically unsaturated hydrocarbon against degradation caused by exposure to UV light by incorporating therein a stabilizing quantity of a mixture of a diphnylamine and a weakly acidic channel-type carbon black with a pH from about 3.5 to about 6.5.

12. The method of claim 11 wherein the polymer is represented by the repeating formula

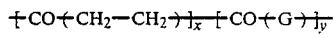

wherein G is the moiety of an ethylenically unsaturated hydrocarbon polymerized through the ethylenic unsaturation and the ratio of y:x is no more than about 0.5.

13. The method of claim 12 wherein the diphenylamine is present in a quantity of from about 0.5% by weight to about 5% by weight based on total polymer.

14. The method of claim 13 wherein the carbon black is present in a quantity of from about 0.5% by weight to about 10% by weight, based on total polymer.

15. The method of claim 14 wherein y is 0.

16. The method of claim 14 wherein the ratio of y:x is from about 0.01 to about 0.1.

17. The method of claim 16 wherein G is a moiety of propylene.

18. The method of claim 17 wherein the diphenylamine is 4,4'-bis(α,α-dimethylbenzyl)diphenylamine.

19. The method of claim 18 wherein the diphenylamine is present in a quantity of from about 0.1% by weight to about 3% by weight, and the carbon black is present in a quantity of from about 1% by weight to about 5% by weight.

20. The method of claim 19 wherein the carbon black has a pH from about 4 to about 5.

* * * * *